(12) United States Patent
Skibinski

(10) Patent No.: US 8,122,852 B2
(45) Date of Patent: Feb. 28, 2012

(54) PET PAW WASHER

(75) Inventor: Kevin J. Skibinski, Geneva, IL (US)

(73) Assignee: Kevin J. Skibinski, Geneva, IL (US)

( * ) Notice: Subject to any disclaimer, the term of this patent is extended or adjusted under 35 U.S.C. 154(b) by 84 days.

(21) Appl. No.: 12/564,825

(22) Filed: Sep. 22, 2009

(65) Prior Publication Data

US 2010/0218730 A1    Sep. 2, 2010

Related U.S. Application Data

(60) Provisional application No. 61/156,603, filed on Mar. 2, 2009.

(51) Int. Cl.
  *A01K 13/00*    (2006.01)
(52) U.S. Cl. .................................................... 119/673
(58) Field of Classification Search .......... 119/650–652, 119/663, 664, 673; 4/489, 498, 505, 539, 4/584; 15/264, 260
  See application file for complete search history.

(56) References Cited

U.S. PATENT DOCUMENTS

| | | | |
|---|---|---|---|
| 874,983 A | 12/1907 | O'Brian et al. | |
| 2,312,524 A | 3/1943 | Cox | |
| 4,317,431 A | 3/1982 | Sparkes | |
| 4,505,229 A | 3/1985 | Altissimo | |
| 4,583,530 A | 4/1986 | Henley | |
| 4,965,906 A * | 10/1990 | Mauro | 15/104.92 |
| 4,987,860 A | 1/1991 | Davis | |
| 5,243,931 A | 9/1993 | McDonough | |
| 5,279,257 A | 1/1994 | Temby | |
| 5,321,867 A | 6/1994 | Probst | |
| 5,388,550 A | 2/1995 | Noble | |
| 5,404,610 A * | 4/1995 | Coyer et al. | 15/104.92 |
| 5,448,966 A | 9/1995 | McKinnon et al. | |
| 5,711,252 A | 1/1998 | Brandolino | |
| 5,758,370 A | 6/1998 | Schwartz | |
| 5,765,507 A * | 6/1998 | Gallego | 119/651 |
| 5,774,909 A | 7/1998 | Stable | |
| 6,120,743 A * | 9/2000 | Papari | 422/300 |
| 6,237,537 B1 * | 5/2001 | Winchester | 119/673 |
| 6,343,612 B1 | 2/2002 | Dahl | |
| 6,382,136 B1 | 5/2002 | Bragulla et al. | |
| 6,435,136 B1 | 8/2002 | Segura Munoz | |
| 6,439,160 B1 | 8/2002 | Wheelwright | |
| 6,463,885 B1 | 10/2002 | Laner | |
| 6,739,286 B2 | 5/2004 | Vander veen | |
| 6,745,424 B1 * | 6/2004 | Pimentel et al. | 15/21.2 |
| 6,745,721 B1 | 6/2004 | Hammer | |
| 6,851,391 B1 | 2/2005 | Mulich et al. | |
| 6,931,675 B1 | 8/2005 | Hager | |
| 7,111,585 B2 | 9/2006 | Hale et al. | |
| 7,198,007 B2 | 4/2007 | Bestelmeyer | |
| 7,302,915 B2 | 12/2007 | Leary et al. | |
| 7,437,795 B1 * | 10/2008 | Bez | 15/261 |
| 7,497,188 B2 | 3/2009 | Cho | |
| 7,500,488 B1 | 3/2009 | Long | |
| 2005/0211270 A1 | 9/2005 | Wheelwright | |
| 2006/0112899 A1 | 6/2006 | Zur | |
| 2007/0278127 A1 | 12/2007 | Solomon | |

* cited by examiner

*Primary Examiner* — Rob Swiatek
*Assistant Examiner* — Ebony Evans

(57) ABSTRACT

A pet paw washing apparatus is disclosed. The pet paw washing apparatus includes a basin and a partition disposed in the basin separating a first chamber from a second chamber. A receptacle may be in the second chamber for receiving a paw through a lid for washing the paw in the receptacle. Water may be transferred via tilting motion using handle from the first chamber to the second chamber through a notch in the partition. Dirty water in the receptacle may be transferred via tilting motion using handle out of the receptacle and into the second chamber through a spout.

10 Claims, 4 Drawing Sheets

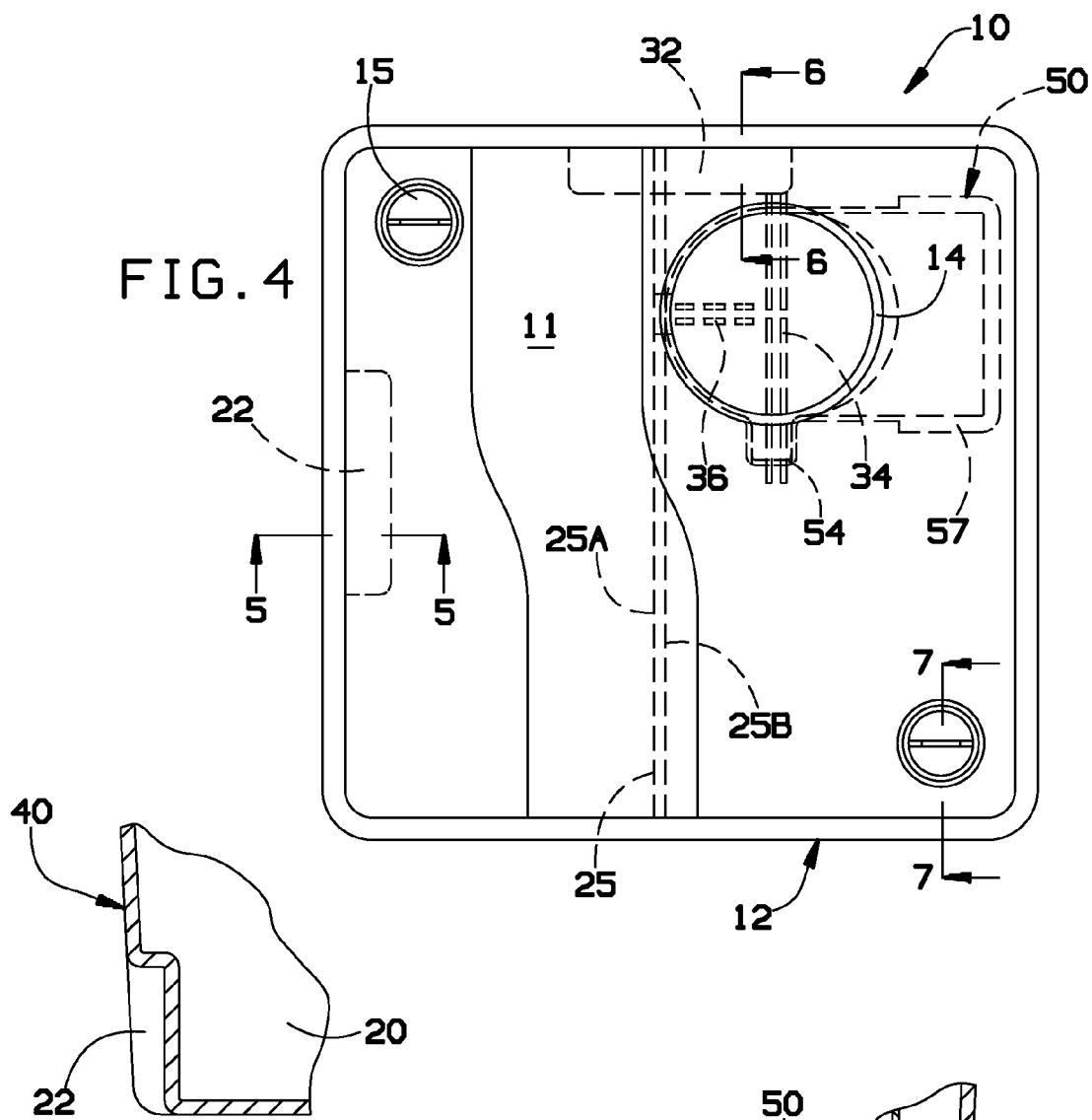
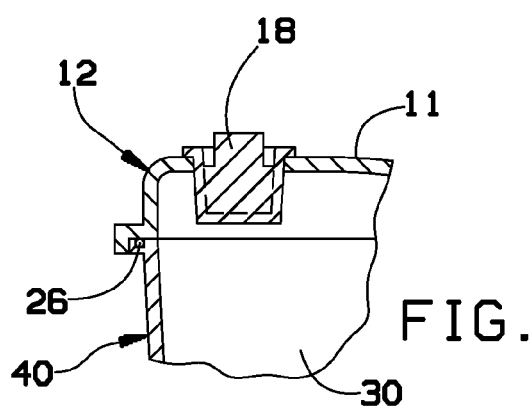

PET PAW WASHER

RELATED APPLICATIONS

This application claims the benefit of priority from and incorporates by reference herein, U.S. Provisional Application No. 61/156,603, filed Mar. 2, 2009.

BACKGROUND OF THE INVENTION

The present invention generally relates to pet care accessories, and more particularly to a pet paw washing apparatus.

Pets can be a source of contamination in people's living areas. One reason why a pet can attract and carry contamination such as harmful bacteria is because pets tend to walk about without paw protection. Thus, dirt, grime, etc. may be picked up and stuck to the bottoms and crevices of a paw.

From a health standpoint, studies have shown that a simple walk around the block or just playing in the backyard can bring several types of strains of germs into a household. These germ scan be spread throughout the entire house by walking on the carpet, jumping on the coach/bed or simply just touching someone or something. Certain types of "bad bacteria" referred to as gram-negative bacteria can cause infections such as sore throats, tonsillitis, strep throat, ear infections.

In some cases, a pet owner may have the need to wash their pet's dirty paws but may not want to bathe the entire pet or transport them to a sink or bath tub for cleaning. Methods used today consist of wet wipes, transporting them to a sink or bath tub or even carrying a bowl of water to the location of cleaning. These solutions can be costly, inconvenient, and in some cases are unhealthy because of reusing dirty water.

As can be seen, there is a need for a pet paw washing apparatus that can conveniently and quickly allow for the washing of pet paws using clean water for each and every paw.

SUMMARY OF THE INVENTION

In one aspect of the present invention, a pet paw washing apparatus comprises a basin; a partition positioned in the basin wherein the sealing wall includes a notch; a first chamber disposed on a first side of the partition; a second chamber disposed on a second side of the partition; a receptacle disposed in the second chamber wherein the receptacle includes a port aligned with the notch; a spout connected to the receptacle; and a lid including covering the basin wherein the lid includes an opening aligned above the receptacle.

These and other features, aspects and advantages of the present invention will become better understood with reference to the following drawings, description and claims.

BRIEF DESCRIPTION OF THE DRAWINGS

FIG. 4 is a top view of the pet paw washing apparatus depicted in FIG. 3;

FIG. 5 is a partial corner view of a pet paw washing apparatus according to an exemplary embodiment of the present invention;

FIG. 6 is a partial corner view of a pet paw washing apparatus according to an exemplary embodiment of the present invention;

FIG. 7 is a partial corner view of a pet paw washing apparatus according to an exemplary embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a pet paw washing apparatus that in one exemplary application may be useful in washing the paws of a pet.

Figure 1:
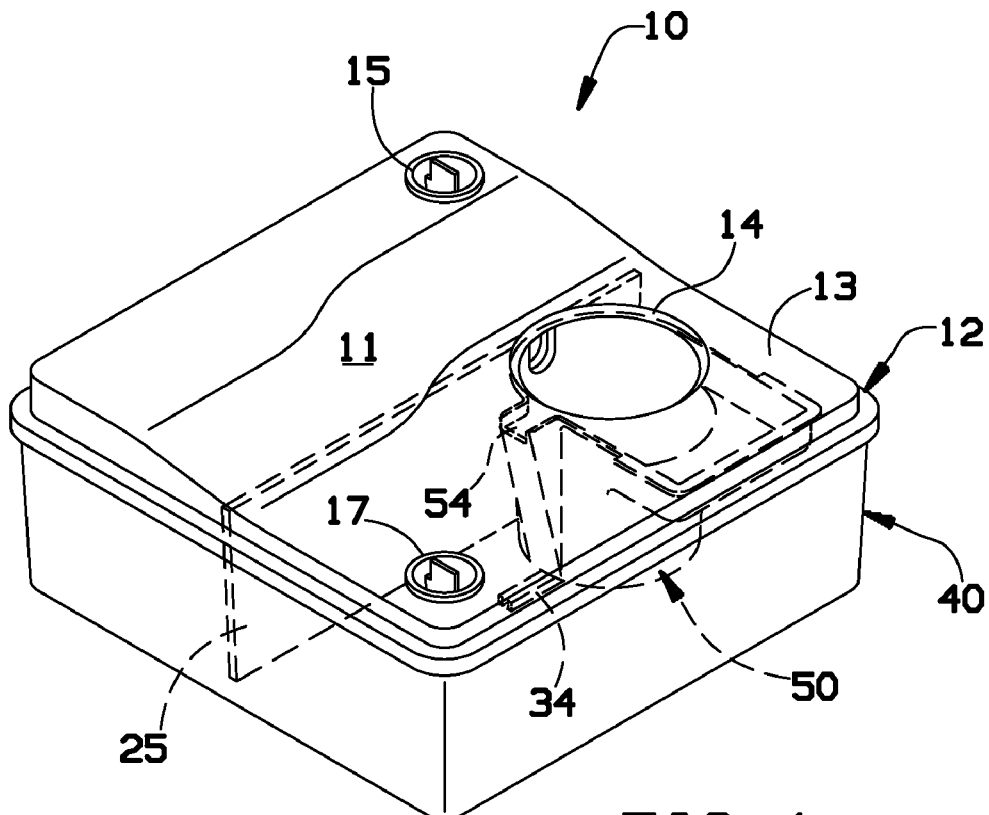
FIG. 1 is an overhead perspective view of a pet paw washing apparatus according to an exemplary embodiment of the present invention.
Figure 3:
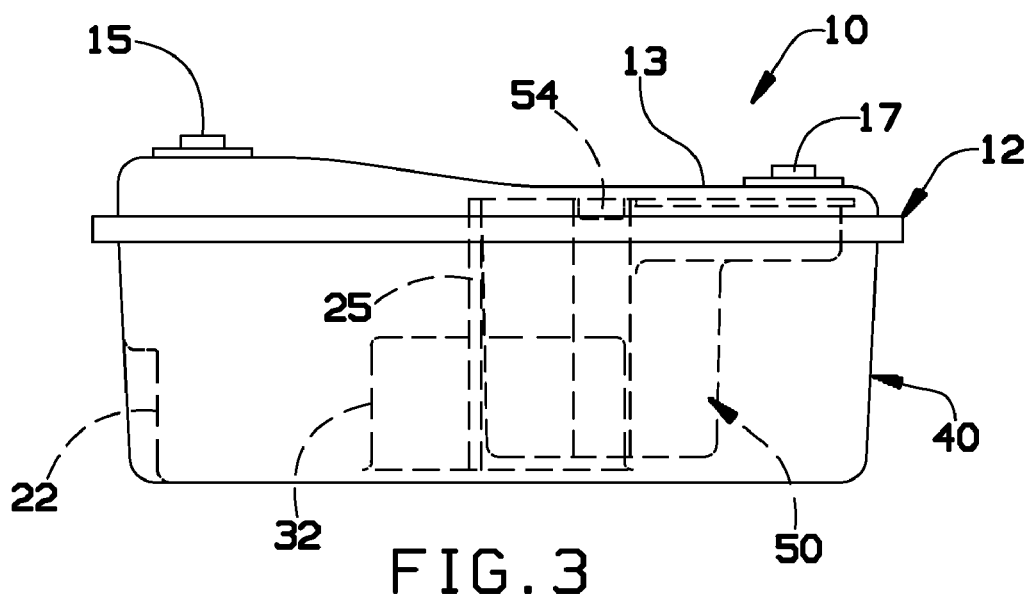
FIG. 3 is a side view of a pet paw washing apparatus according to an exemplary embodiment of the present invention.
Figure 2:
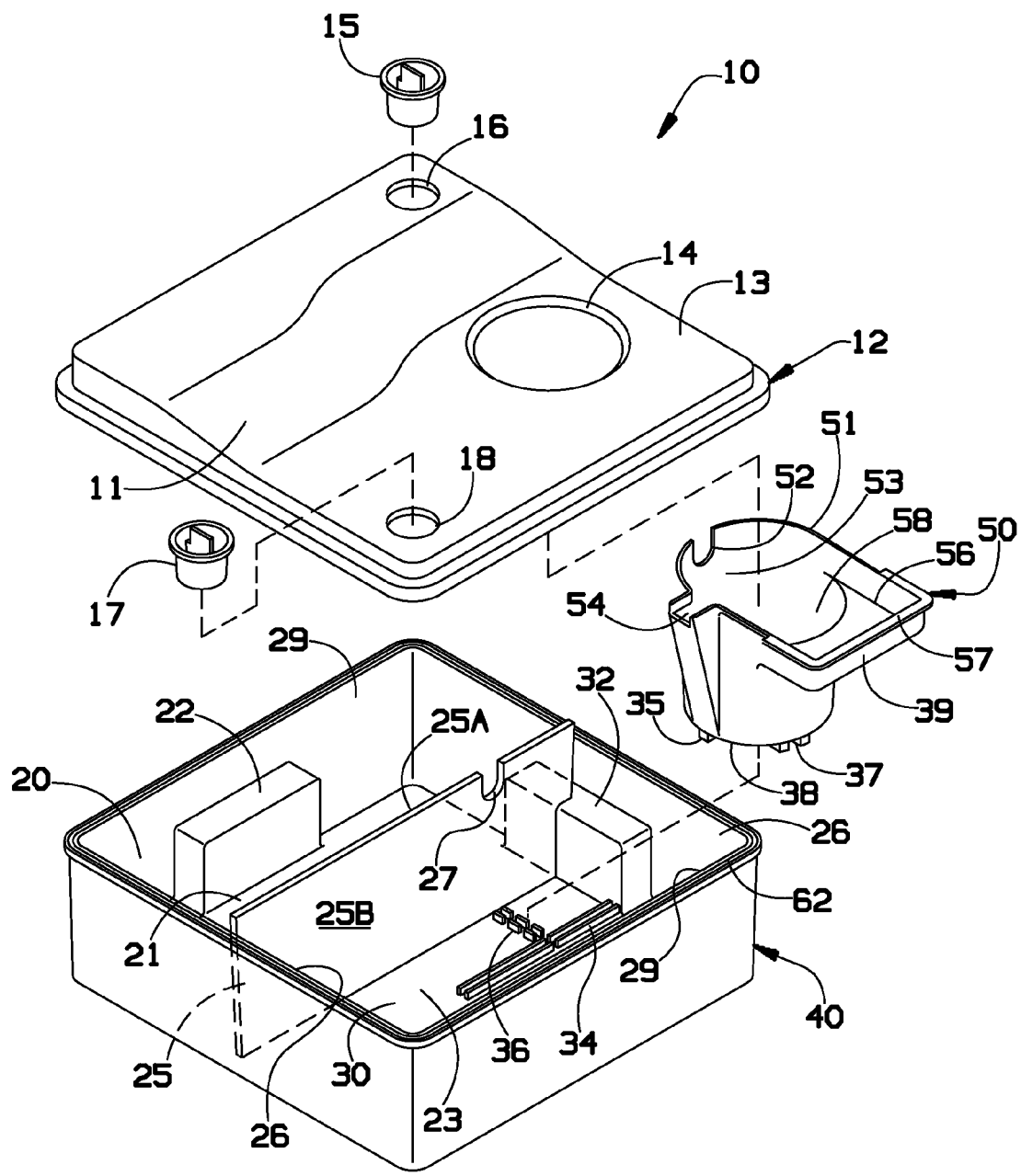
FIG. 2 is an exploded view of the pet paw washing apparatus depicted in FIG. 1.
Figure 8:
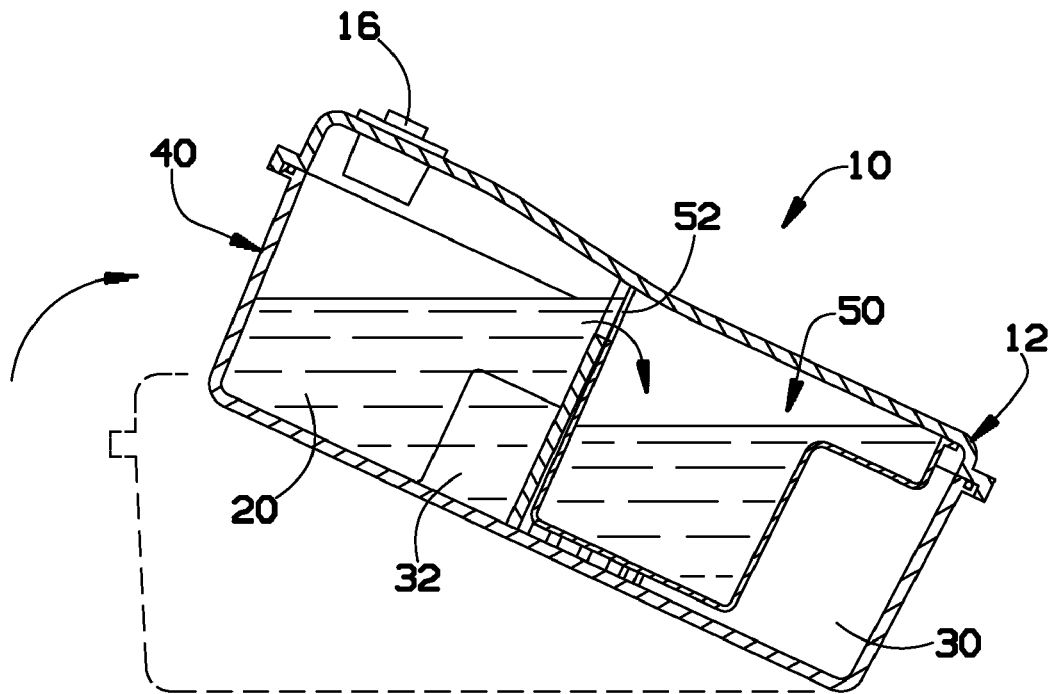
FIG. 8 is a side view of a pet paw washing apparatus according to an exemplary embodiment of the present invention.
Figure 9:
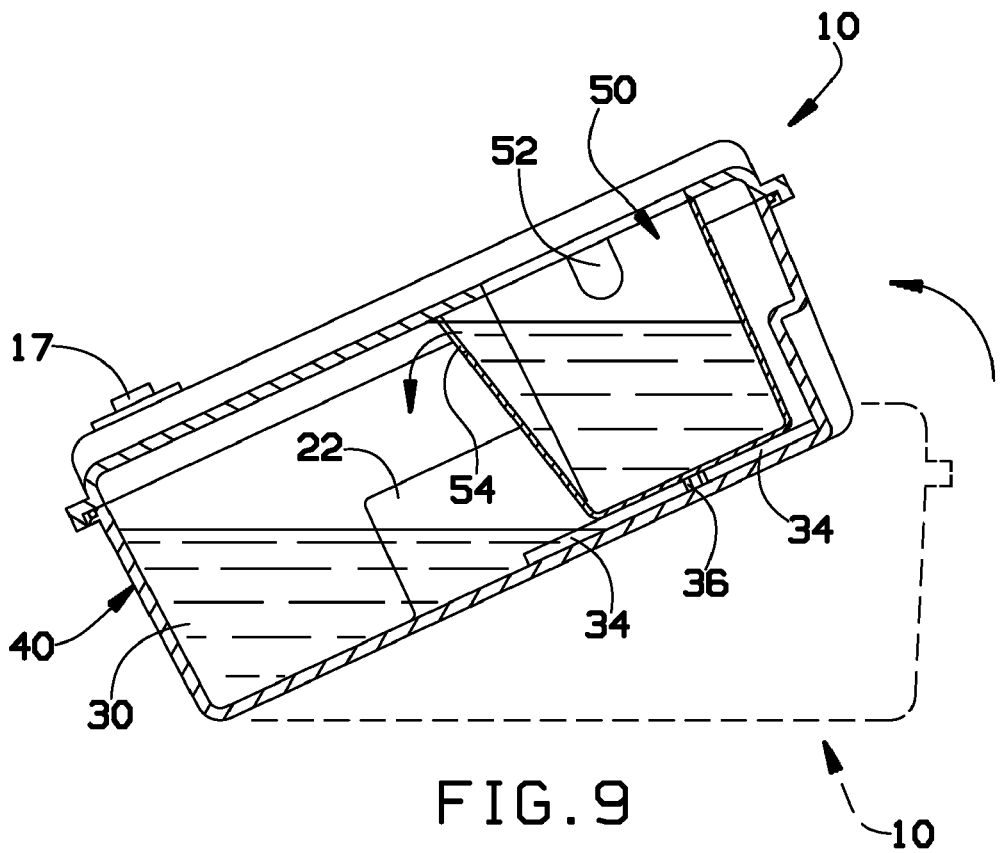
FIG. 9 is a side view of a pet paw washing apparatus according to an exemplary embodiment of the present invention.

Referring to FIGS. 1 and 2, a pet paw washing apparatus 10 may generally include a basin 40, a lid 12, and a receptacle 50 disposed in the basin between the lid and the basin. The pet paw washing apparatus 10 may be shaped generally rectangular but it will be understood that other shapes may be employed without departing from the scope of the present invention.

The basin 40 may include a partition 25 positioned between a pair of walls 29 to bisect a pair of walls 26. The partition 25 may contact a basin floor 23 and in cooperation with the walls 26, essentially seal off a periphery of the partition 25 to define a chamber 20 on one side 25a of the partition 25 and a chamber 30 on the other side 25b of the partition 25. The chamber 20, in one exemplary embodiment, may be referred to as a clean water reservoir, while the chamber 30 may be referred to as a dirty water reservoir. The partition 25 may also include an upper edge 21 including a notch 27 positioned along the edge 21. The basin 40 may further include handles 22 and 32 that may be shaped as indentions protruding inward into the chambers 20 and 30 from walls 29 and 26 respectively. The chamber 30 may include tracks 34 and 36 formed on the basin floor 23. The basin 40 may also incorporate a grooved sealing edge 62 along its upper periphery.

The receptacle 50 may be generally cup-shaped and may include a well 58, an upper edge 51, a lip 57, and an overflow cavity 56. The upper edge 51 may incorporate a port 52 on wall 53 and a spout 54. A bottom surface 38 of the receptacle 50 may include guide rails 35 and 37. In one exemplary embodiment, when the receptacle 50 is disposed within the chamber 30, the guide rails 35 and 37 may be inserted to fit within the tracks 34 and 36. The receptacle 50 may be oriented so that the port 52 is in alignment with and in fluid communication with the notch 27. The overflow cavity 56 may be defined by a ledge 39 protruding distally from the wall 53 wherein the lip 57 projects from the upper edge 51 circumventing the ledge 39. The ledge 39 and overflow cavity 56 may be higher than the well 58. In one exemplary embodiment, the receptacle 50 is sealed to lid 12 to prevent water from leaking out during the filling process. The spout 54 may face toward what is essentially empty space in the chamber 30 and in one exemplary embodiment, may face roughly 90 degrees from the direction of the port 52. The spout 54 may gradually taper upward from the bottom surface 38 and outward from the wall.

The lid 12 may be generally flat with a contoured upper surface 13. The upper surface 13 may incorporate an opening 14 that may be aligned with the receptacle 50 when the lid 12 is positioned over the basin 40. The opening 14 may be generally wide enough to permit, for example, a paw to pass freely through the opening and into the receptacle 50 and well 58. The upper surface 13 may incorporate a raised contour step 11. The lid 12 may also include an water fill entry hole 16 positioned over the chamber 20 and an outflow hole 18 positioned over the second chamber 30 when the lid 12 is positioned over the basin 40. A plug 15 may be included that may fit within and seal off the clean water fill entry hole 16 and a plug 17 may be included to fit within and seal off the dirty water outflow hole 18. The lid 12 may further include a sealing edge 64 about the lid periphery that may be grooved to fit within the basin sealing edge 62. In one exemplary embodiment, when the lid 12 is positioned over the basin 40, the sealing edge 64 of the lid 12 and the sealing edge 62 of the basin 40 may be press fit together to seal the chambers 20 and 30 from the ambient environment. The receptacle 50 may be held in place by the sealing of the lip 57 to the inside of the lid 12 and the entire receptacle being pressure fit between the lid 12 and bottom of basin 40 secured in tracks 36. Also, the edge 21 of the partition 25 may contact an underside (not shown) of the lid 12 so that the chamber 20 may be completely sealed off from the chamber 30 with the exception of the notch 27 permitting fluid communication therebetween.

Thus, in one exemplary embodiment of operation, a user will begin with filling the chamber 20 using the clean water fill entry hole 16 with clean water and optionally, may include a pet detergent (not shown) within the chamber 20. When the user is ready to, for example, wash a paw (not shown), the user may grasp the handle 22 with fingers (not shown) while positioning thumbs (not shown) on the contoured surface 13. The user may tilt the pet paw washing apparatus 10 using handle 22 so that fluid from the chamber 20 passes through the partition 25 through the notch 27 into the receptacle 50. The user may thus have manual control over how much fluid is transferred from the chamber 20 into the chamber 30 to fill up the well 58. In the event the well is filled beyond capacity, a buffer of fluid capacity may be controlled by fluid entering the overflow cavity 56. An overflow of fluid may be contained and diverted back into the well 58 as it encounters the sealed intersection of the lid 12 and the lip 57. One may also appreciate that a rate of fluid transferred may be controlled by how much the unit is tilted upward by the user using handle 22.

When the receptacle 50 is sufficiently filled with fluid from chamber 20, the entire apparatus is positioned through a sliding motion under the dirty paw that needs to be cleaned. The paw is then inserted in through the opening 14. It will be understood that the inserted paw may be cleaned by soaking or scrubbing as desired by the user. During cleaning, dirty water is transferred from the receptacle 50 into the chamber 30 may be mitigated from re-entering the well 38 by virtue of the spout 54 and receptacle 50 being elevated above the dirty water level and essentially sealed off from the chamber 30. Thus, when a paw is finished being cleaned, the user may tilt the pet paw washing apparatus 10 orthogonally from the port 27 in a direction toward the spout 54 using handle 32 so that dirty water empties out of the well 38 through the spout 54 into the chamber 30. The pet paw washing apparatus 10 may be reset by tilting the apparatus so that fresh clean water flows once again through the notch 27 and port 52 refilling the receptacle 50. After several days of use, depending on the frequency of use, the pet owner can pick up the entire apparatus and transport to sink for draining. Removing the dirty water plug 17, the user can then drain all the dirty water into the sink by simply tilting the unit and letting the dirty water come out of the dirty water drain hole 18. Subsequently, fresh clean water can then be added by removing plug 15 and filling reservoir 20 using the fresh water fill hole 16. By securing both plugs 15, 17, the apparatus can be stored for future use.

It should be understood, of course, that the foregoing relates to exemplary embodiments of the invention and that modifications may be made without departing from the spirit and scope of the invention as set forth in the following claims.

I claim:

1. A pet paw washing apparatus, comprising:
    a basin;
    a partition positioned in the basin wherein the partition includes a notch depends downwardly from an upper edge of said partition;
    a first chamber disposed on a first side of the partition;
    a second chamber disposed on a second side of the partition;
    a receptacle disposed in the second chamber wherein the receptacle includes a port positioned along the upper edge of the receptacle aligned with the notch; said port and said notch being of similar shape;
    a spout connected to the receptacle; and
    a lid covering the basin wherein the lid includes an opening aligned above the receptacle.

2. The pet paw washing apparatus of claim 1 wherein the lid includes a sealing edge sealing the lid over the basin.

3. The pet paw washing apparatus of claim 1 further comprising:
    one or more guide rails on a bottom surface of the receptacle; and
    one or more tracks disposed on a floor of the second chamber wherein the one or more guide rails are aligned with and fit into the one or more tracks.

4. The pet paw washing apparatus of claim 1 wherein the receptacle includes
    an overflow cavity.

5. The pet paw washing apparatus of claim 1 wherein the lid includes a water
    fill entry hole disposed over the first chamber.

6. The pet paw washing apparatus of claim 5 further comprising a plug configured to fit within the water fill entry hole.

7. The pet paw washing apparatus of claim 1 further comprising an indented handle disposed on an outer wall of the basin.

8. The pet paw washing apparatus of claim 1 wherein a top edge of the partition is sealed against the lid.

9. The pet paw washing apparatus of claim 1 wherein the receptacle includes a lip disposed between the lid and the basin and wherein the receptacle is sealed watertight between the lid and the second chamber.

10. The pet paw washing apparatus of claim 1 wherein the opening is disposed for a paw to pass through the opening into the receptacle.

* * * * *